(12) United States Patent
Burnett et al.

(10) Patent No.: US 7,650,073 B2
(45) Date of Patent: Jan. 19, 2010

(54) SYSTEM AND METHOD FOR DISCOVERING WAVELENGTHS IN NETWORK ELEMENTS HAVING AN OPTICAL ARCHITECTURE

(75) Inventors: Robert Burnett, Plano, TX (US);
Dewayne Bridges, Plano, TX (US);
James Ries, Plano, TX (US)

(73) Assignee: Alcatel Lucent, Paris (FR)

( * ) Notice: Subject to any disclaimer, the term of this patent is extended or adjusted under 35 U.S.C. 154(b) by 608 days.

(21) Appl. No.: 10/750,123

(22) Filed: Dec. 29, 2003

(65) Prior Publication Data
US 2005/0141437 A1   Jun. 30, 2005

(51) Int. Cl.
*H04J 14/02* (2006.01)
(52) U.S. Cl. .......................................... 398/31; 398/69
(58) Field of Classification Search ................ 398/31, 398/34, 69
See application file for complete search history.

(56) References Cited

U.S. PATENT DOCUMENTS 5,781,537 A * 7/1998 Ramaswami et al. ........ 370/254
6,694,100 B1 * 2/2004 Fatehi et al. .................. 398/99
2001/0003485 A1   6/2001 Wolf
2002/0018269 A1   2/2002 Chaudhuri et al.
2002/0171886 A1 * 11/2002 Wu et al. ..................... 359/110

FOREIGN PATENT DOCUMENTS

| EP | 1265451 A2 | 12/2002 |
|---|---|---|
| WO | 99/40700 | 8/1999 |

* cited by examiner

*Primary Examiner*—Leslie Pascal
(74) *Attorney, Agent, or Firm*—Garlick Harrison & Markison (57) ABSTRACT

A system and method of wavelength discovery in network elements having an optical architecture. In one embodiment, a first wavelength topology map is generated for wavelengths inserted in a first direction at each network element. A second wavelength topology map is generated for wavelengths inserted in a second direction at each network element. The first wavelength topology maps are transmitted in the first direction to adjacent network elements over a dedicated overhead wavelength channel. Similarly, the second wavelength topology maps are transmitted in the second direction to adjacent network elements over the dedicated overhead wavelength channel. Responsive to messaging via the dedicated overhead wavelength channel, each of the first and second topology maps are updated at each of the network elements.

6 Claims, 4 Drawing Sheets

SYSTEM AND METHOD FOR DISCOVERING WAVELENGTHS IN NETWORK ELEMENTS HAVING AN OPTICAL ARCHITECTURE

BACKGROUND OF THE INVENTION

1. Technical Field of the Invention

The present invention generally relates to optical networks. More particularly, and not by way of any limitation, the present invention is directed to a system and method for discovering wavelengths in network elements having an optical architecture.

2. Description of Related Art

Optical networks are high-capacity telecommunications networks comprised of optical and opto-electronic technologies and components, and provide wavelength-based services in addition to signal routing, grooming, and restoration at the wavelength level. These networks, based on the emergence of the so-called optical layer operating entirely in the optical domain in transport networks, can not only support extraordinary capacity (up to terabits per second (Tbps)), but also provide reduced costs for bandwidth-intensive applications such as the Internet, interactive video-on-demand and multimedia, and advanced digital services.

Of the several key enabling technologies necessary for the successful deployment of optical networks, dense wavelength division multiplexing (DWDM) is of particular significance. DWDM is a fiber-optic transmission technique that increases the capacity of embedded fiber by first assigning incoming optical signals to specific wavelengths within a designated frequency band (e.g., channels separated by sub-nanometer spacing) and then multiplexing the resulting signals out onto a single fiber. By combining multiple optical signals using DWDM, they can be amplified as a group and transported over a single fiber to increase capacity in a cost-effective manner. Each signal carried can be at a different rate (e.g., Optical Carrier (OC)-3, OC-12, OC-48, etc.) and in a different format (e.g., Synchronous Optical Network (SONET) and its companion Synchronous Digital Hierarchy (SDH), Asynchronous Transfer Mode (ATM), Internet Protocol (IP) data, etc.). The forwarded optical signals are transported over fiber optic cables supported by network elements, such as terminal multiplexers and add/drop multiplexers, that provide network operations functionalities and transport network functions such as adding, dropping, regenerating, and permitting the passage of wavelengths.

Many of the maintenance operations associated with the optical network involve field operation technicians, i.e., "craftpersons" or "crafts," interfacing with network elements via terminals. Prior to commencing maintenance operations on a network element, which may involve taking the network element off-line, the craft must have an understanding of how the network element affects other network elements so that data transmissions will not be corrupted or interrupted. In this regard, it is critical to have an indication of the passthrough traffic in the network element. In exist ing optical networks, crafts consult a manual record of the optical network layout in order to account for passthrough wavelengths. Typically, these records are stored in a network management database, spreadsheet or handwritten logbook. These records may not be co-located with the network element and may not be readily accessible to the craft during maintenance operations. Moreover, the records may be stale or contain errors due to the manual upkeep associated with the records.

SUMMARY OF THE INVENTION

Accordingly, the present invention provides a solution for wavelength discovery in network elements having an optical architecture. In one aspect, the present invention is directed to a wavelength discovery method for network elements having an optical architecture. The method includes generating a first wavelength topology map of wavelengths inserted in a first direction at each network element, generating a second wavelength topology map of wavelengths inserted in a second direction at each network element, forwarding the first wavelength topology maps in the first direction to adjacent network elements over a dedicated overhead wavelength channel, forwarding the second wavelength topology maps in the second direction to adjacent network elements over the dedicated overhead wavelength channel, and responsive to messaging via the dedicated overhead wavelength channel, updating each of the first and second topology maps at each of the network elements.

In one presently preferred exemplary embodiment, the overhead channel messaging is effectuated via a wavelength of a wavelength division multiplex (WDM) network. Moreover, the updating of each of the first and second topology maps determines passthrough wavelengths at each network element and may involve generating wavelength source information at each network element. The overhead channel comprising a dedicated Data Communications Channel (DCC) wavelength of a WDM network may be involved in providing Operations, Administration, Maintenance and Provisioning (OAM&P) information. The updated local wavelength maps are operable to provide a craft person an indication of the passthrough wavelengths in the network elements or the updated local wavelength maps during maintenance operations on the network elements to determine protection switching. Further, the updated local wavelength maps may provide an indication of how the network elements affect each other during local maintenance operations.

In another aspect, the present invention is directed to a system for discovering wavelengths in a plurality of network elements. The system includes means for generating a first wavelength topology map of wavelengths inserted in a first direction at each network element and means for generating a second wavelength topology map of wavelengths inserted in a second direction at each network element. Means for forwarding the first wavelength topology maps in the first direction to adjacent network elements over a dedicated overhead wavelength channel and means for forwarding the second wavelength topology maps in the second direction to adjacent network elements over the dedicated overhead wavelength channel are provided. Means responsive to messaging via the dedicated overhead wavelength channel updates each of the first and second topology maps at each of the network elements.

In another aspect, the present invention is directed to an optical network. In one embodiment, a first network element associated with the optical network is operable to generate a wavelength topology map having a first map portion and a second map portion. The first map portion associated with the first network element is specific to a first direction of the optical network and the second map portion associated with the first network element is specific to a second direction of the optical network. Similarly, a second network element associated with the optical network is operable to generate a wavelength topology map having a first map portion and a second map portion. Likewise, the first map portion associated with the second network element is specific to the first direction of the optical network and the second map portion associated with the network element is specific to the second direction of the optical network. A dedicated overhead wavelength channel connects the first network element to the second network element to transmit the first map portion to the second network element over the dedicated overhead wavelength channel. The second network element utilizes the first map portion associated with the first network element to update the first map portion associated with the second network element.

In one implementation, responsive to receiving the first map portion associated with the first network element, the second network element forwards the updated first map portion associated with the second network element to an adjacent network element. Alternatively, responsive to receiving the first map potion associated with the first network element, the second network element transmits the second map portion associated with the second network element to the first network element.

BRIEF DESCRIPTION OF THE DRAWINGS

The accompanying drawings are incorporated into and form a part of the specification to illustrate the preferred embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1A:
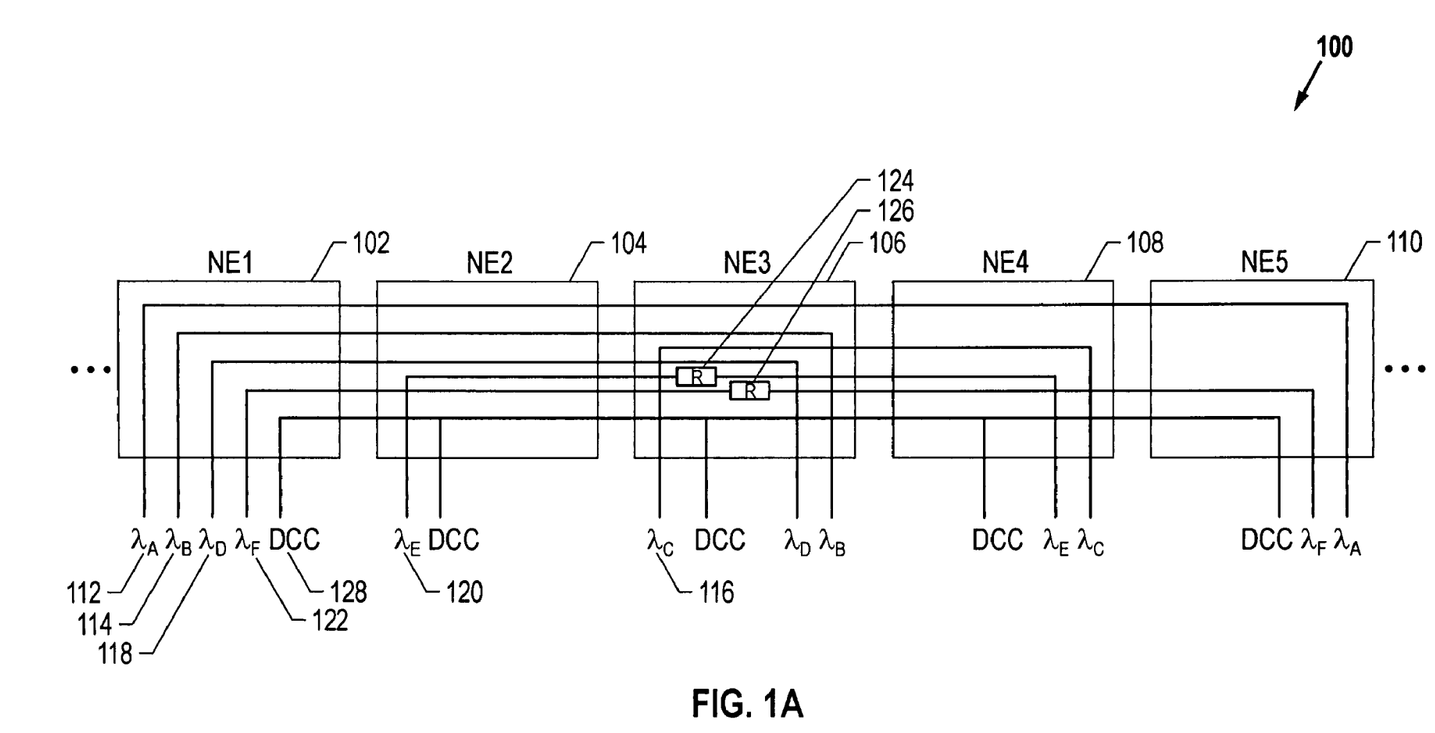
FIG. 1A depicts a schematic diagram of an exemplary embodiment of an optical network employing a system for discovering wavelengths in network elements having an optical architecture in accordance with the teachings of the present invention.

Presently preferred embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1A, there is shown an exemplary representation of an optical network 100 wherein the teachings of the present invention may be advantageously employed. As illustrated, the optical network 100 includes network elements 102 through 110, which are respectively labeled NE1, NE2, NE3, NE4, and NE5. The illustrated optical network 100 may form a portion of a larger optical network, such as a WDM or DWDM network, for example. In one embodiment, the larger optical network is a SONET-based ring that includes terminal multiplexers serving as end point devices, add/drop multiplexers, matched nodes interconnecting the SONET ring to another SONET ring, and the like. For purposes of illustration and not by way of limitation, the present invention will continue to be described with respect to a WDM ring.

The network elements NE1 102 through NE5 110 may be any type of network element performing various wavelength related tasks such as adding wavelengths, dropping wavelengths, regenerating wavelengths and providing for the passage of wavelengths therethrough, for example. As depicted, wavelengths 112-122, which are respectively labeled $\lambda_A$, $\lambda_B$, $\lambda_C$, $\lambda_D$, $\lambda_E$, and $\lambda_F$, are transmitted on an optical medium from West to East, i.e., from the direction of NE1 102 to the direction of NE5 110 and from the East to West direction as well in order to form a cross-connection. Further, it should be understood by those skilled in the art that the terms "East" and "West" do not necessarily refer to the cardinal directions of geography. Since the East or West designations have no real meaning, other means are provided for specifying the directionality. For instance, supervisory channels designated as SPV1 and SPV2 are chosen to indicate an overhead Data Communications Channel (DCC) 128 supervision frequency that is flowing out of or into a multiplexer board connected to the ring network. Specifically, wavelength 112 is inserted at NE1 102 and travels through network elements NE2 104-NE4 108 to NE5 110 where wavelength 112 is dropped. Additionally, as part of the cross-connection NE5 110 inserts wavelength 112, which travels to NE1 102. Similarly, for wavelengths 114, 118, and 122 cross-connections are formed between NE1 102 and NE3 106, NE3 106, and NE5 110, respectively. Wavelength 116 is inserted and dropped at each of NE3 106 and NE4 108 and wavelength 120 is inserted and dropped at each of NE2 104 and NE4 108 in order to form cross-connections. Additionally, wavelengths 120 and 122 are regenerated at NE3 106 as indicated by regeneration indicia 124 and 126. In the present invention, as will be explained in more detail hereinbelow, the network elements 102-110 respectively discover wavelengths and generate a wavelength topology map of the wavelengths inserted and dropped thereat and wavelengths passed therethrough. For example, NE2 104 generates an East wavelength topology map that indicates wavelength 120 is inserted at NE2 104 and wavelengths 112, 114, 118, and 122 are passed therethrough. Those skilled in the art will readily recognize that in actual implementation, each NE internally maintains two direction-specific topology maps, one for each "side/direction" (e.g., East or West) of the ring network. When the user/craft wishes to retrieve the topology information for the NE, the information contained in the two internal maps is processed in relationship to each other in order to provide the user/craft with the needed information.

A dedicated overhead wavelength channel, referred to and depicted as DCC 128, provides an out-of-band communications channel for operations, administration, maintenance, and provisioning (OAM&P) functions that are important for overall network management, which includes failure recovery, performance monitoring, error compensation, and the like. In a presently preferred exemplary embodiment of the present invention, the DCC wavelength of the WDM network is operable to provide for forwarding of the wavelength topology maps generated at each network element to adjacent network elements in either of the directions. Further, responsive to receiving the forwarded map portion, the network element may update its map portion and forward the updated first map portion in the direction that the forwarded map portion was received to another adjacent network element. Alternatively, responsive to receiving the forwarded map portion, the network element may update its map portion and transmit its corresponding direction-specific map portion, e.g., if a particular NE forwarded a West map portion, then the corresponding portion at the adjacent NE is an East map portion, which is transmitted back to the network element which forwarded the map portion.

The following illustrative example further explains wavelength insertion and the responses to receiving a forwarded map portion. An originating NE inserts a wavelength and sends wavelength information in the form of a map corresponding to the inserted wavelength to an adjacent NE indicating to the adjacent NE the wavelength and the name of the originating NE that inserted the signal. The adjacent NE checks to see if it is inserting the same wavelength back towards the originating NE that provided the wavelength information, i.e., the adjacent NE checks to see if it forms a cross-connection with the originating NE that provided the wavelength information.

If the adjacent NE is inserting the wavelength back upstream towards the originating NE, then the adjacent NE sends wavelength information back to the originating NE such that the originating NE has information about the destination of the signal it just inserted. On the other hand, if the adjacent NE does not insert the wavelength back towards the originating NE, then the wavelength is passed through and the adjacent NE updates its wavelength information to reflect that the wavelength is a passthrough wavelength sourced from the originating NE. Eventually, as the wavelength and wavelength information continues the propagation, the NE that is capable of transponding with the originating NE will receive the wavelength map and propagate its wavelength map information back through the intervening adjacent NEs to the originating NE.

Figure 1B:
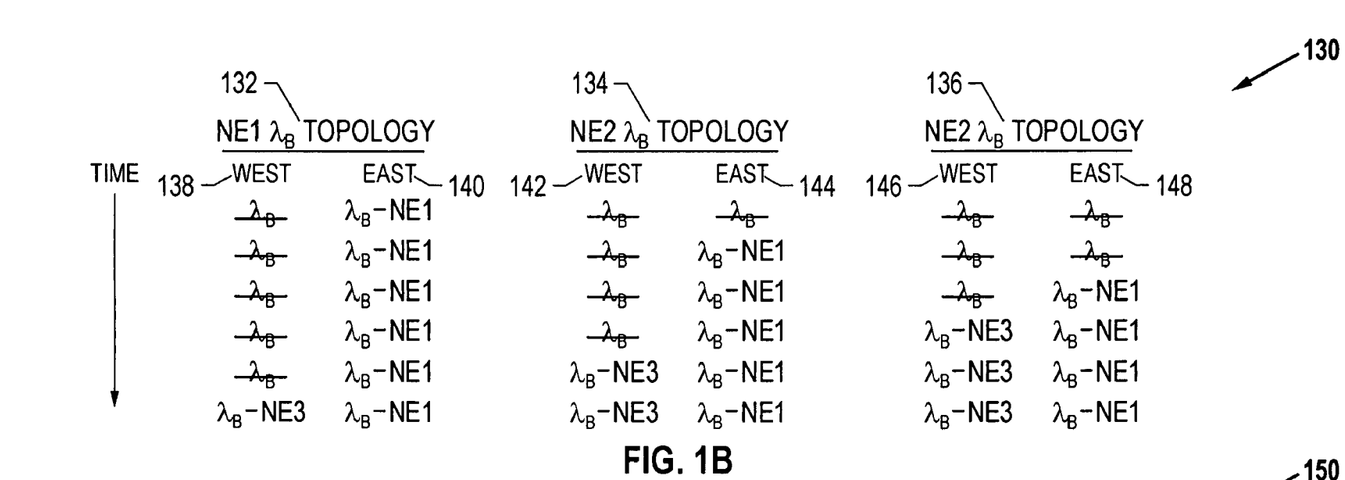
FIG. 1B depicts a tabular representation of portions of wavelength topology maps corresponding to network elements NE1-NE3 of FIG. 1A during initial wavelength discovery phase.

FIG. 1B depicts a time-dependent tabular representation 130 of $\lambda_B$ wavelength topology maps corresponding to network elements NE1 102, NE2 104, and NE3 106 of FIG. 1A during wavelength discovery. Specifically, wavelength topology map 132 includes a West portion 138 and an East portion 140 relating to wavelength 114 (i.e., $\lambda_B$) such that each portion describes one side of the NE's interface. Similarly, wavelength topology map 134 includes a West portion 142 and an East portion 144 relating to wavelength 114 and wavelength topology map 136 includes a West portion 146 and an East portion 148 relating to wavelength 114, i.e., $\lambda_B$. Initially, $\lambda_B$ 114 is inserted at NE1 102. Accordingly, the East portion 140 of wavelength topology map 132 includes the information that the source of wavelength 114 is NE1 102 as represented by the "$\lambda_B$-NE$_1$" designation. At this time, the other map portions, i.e., map portions 138, 142, 144, 146, and 148, have no information relative to wavelength 114 as indicated by the "$\lambda_B$" designations. The East portion 140 of wavelength topology map 132 is forwarded in the East direction to NE2 104, which receives the East portion 140 and update its East-bound portion 144 of wavelength topology map 134. Responsive thereto, NE2 104 accordingly determines the disposition of wavelength 114.

As illustrated in FIG. 1A, NE2 104 permits wavelength 114 to pass through NE2 104 to NE3 106. NE2 104 forwards the East portion 144 of wavelength topology map 134 to NE3 106 where NE3 106 incorporates the East portion 144 into East portion 148 of wavelength topology map 136. As alluded to hereinabove in the description of FIG. 1A, NE3 106 includes a transponder which is operable to receive signals on wavelength 114 in one direction and insert the received signals in the opposite direction. Hence, upon completing the incorporation, NE3 106 inserts wavelength 114, updates the West portion 146 of wavelength topology map 136 to indicate that the source of wavelength 114 is NE3 106 as represented by the "$\lambda_B$-NE3" designation, and forwards the West portion 146 of wavelength topology table 136 in the West direction to NE2 104, which receives the West portion 146 and incorporates it into its West portion 142 of the map 134 associated therewith. Since NE2 104 determines that wavelength 114 is a passthrough wavelength, it incorporates the received map portion 146 into its West-bound map portion 142 and forwards it to NE1 102. As previously discussed, NE1 132 includes a transponder operable to send and receive wavelength 114. NE1 132 then incorporates the West portion 142 of wavelength topology map 134 into the West portion 138 of wavelength topology map 132 associated therewith. As illustrated in the bottom rows of the tabular representation 130, upon completing the cross-connect with respect to $\lambda_B$ 114, i.e., the round trip from NE1 102 to NE3 106 and back, all of the NEs that insert or drop wavelength 114 or provide for the passage of wavelength 114 therethrough are aware of the source and destination information of wavelength 114. Hence, this cascading forwarding and updating scheme of the present invention leverages existing hardware and an overhead channel to provide each network element an indication of all the wavelength behavior relevant to that network element. In one embodiment, network elements may forward their respective wavelength topology maps to adjacent network elements at regular intervals, e.g., at the expiration of a timer, or upon receiving an update. In this manner, accurate wavelength topology maps are maintained.

Figure 1C:
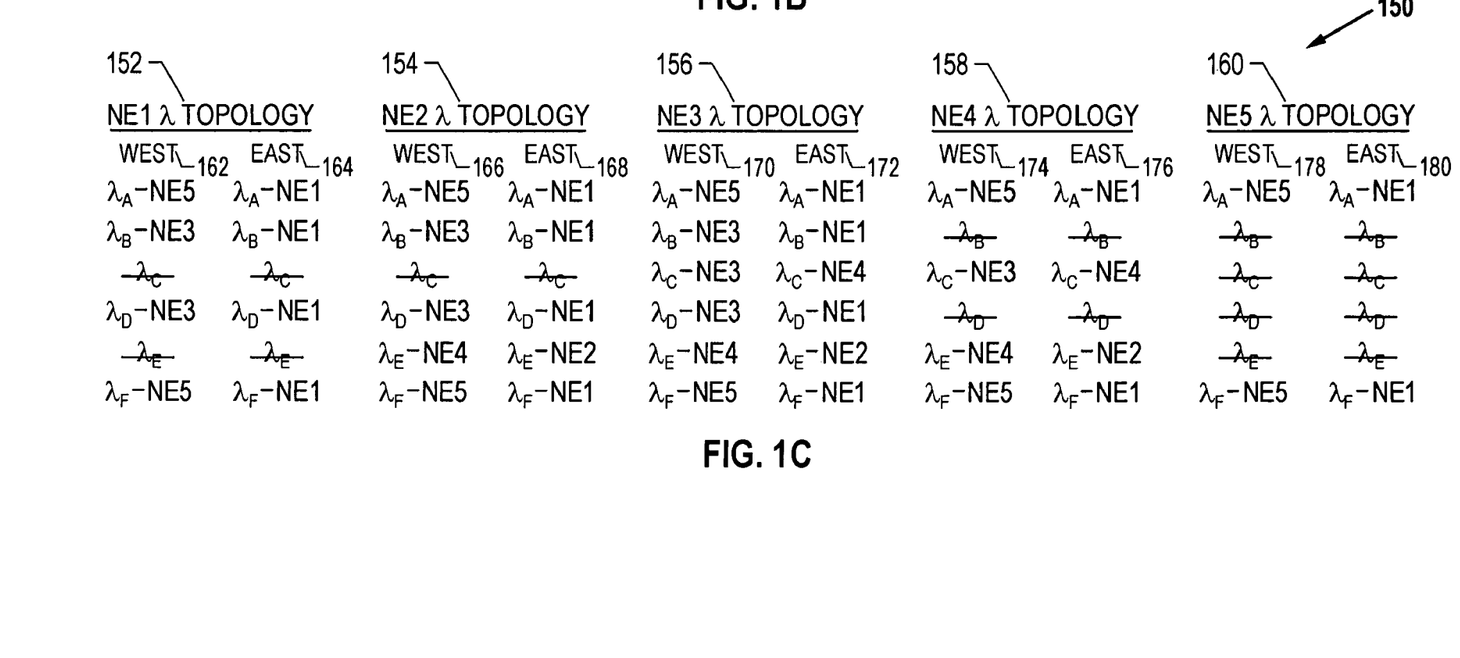
FIG. 1C depicts a tabular representation of updated wavelength topology maps corresponding to the network elements of FIG. 1A.

FIG. 1C depicts a tabular representation 150 of updated wavelength topology maps corresponding to the network elements NE1-NE5 of FIG. 1A. In particular, wavelength topology map 152 is associated with NE1 102, wavelength topology map 154 is associated with NE2 104, wavelength topology map 156 is associated with NE3 106, wavelength topology map 158 is associated with NE4 108, and wavelength topology map 160 is associated with NE5 110. It should be appreciated that any of these topology maps may be designated a first wavelength topology map and another topology map a second wavelength topology map. Moreover, each of the wavelength topology maps includes a pair of direction-specific portions which may each be considered a first map portion or a second map portion. Specifically, as illustrated, wavelength topology map 152 includes West portion 162 and East portion 164. Similarly, wavelength topology map 154 includes West portion 166 and East portion 168, wavelength topology map 156 includes West portion 170 and East portion 172, wavelength topology map 158 includes West portion 174 and East portion 176, and wavelength topology map 160 includes West portion 178 and East portion 178.

The wavelength—network element notations depicted in maps 152-160 indicate wavelength and source information. For example, within the West portion 166 of network topology map 154 the expression "$\lambda_A$-NE5" indicates that wavelength 112 was received by NE2 104 from NE5 110 and within the East portion 168 of network topology map 154 the expression "$\lambda_A$-NE1" indicates that wavelength 112 was received by NE2 104 from NE1 152. Hence, the composition of the West portion 166 and the East portion 168 of the network topology map 154 provides an indication that with respect to NE2 104, wavelength 112 is a passthrough wavelength. Moreover, the composition of the West portion 166 and the East portion 168 indicates that the transponders for wavelength 112 are positioned at NE1 102 for East bound transmissions and NE5 110 for West bound transmissions.

By way of another example, consider the "$\lambda_E$-NE4" and "$\lambda_E$-NE2" designations of the West portion 166 and East portion 168, respectively, of network topology map 154. The "$\lambda_E$-NE4" designation indicates that NE2 104 receives wavelength 120 from NE5 110 via a West bound transmission and the "$\lambda_E$-NE2" designation indicates that NE2 104 inserts wavelength 120 in the East bound direction. Hence, the composition of the West portion 166 and East portion 168 provides an indication that wavelength 120 travels between transducers positioned at NE2 104 and NE5 110. By way of a further example, the $\lambda_C$ indicia in West portion 166 and East portion 168 indicates that NE2 104 has no information relative to wavelength 116, i.e., wavelength 116 is not received, inserted, or passed through NE2 104. Accordingly, when considered in its entirety, wavelength topology map 154 indicates that wavelengths 112, 114, 118, and 122 pass through NE2 104. Additionally, NE2 104 forms a cross-connection for wavelength 120 with NE4 108.

It should be appreciated that the West and East designations may also accommodate other network arrangements not depicted. For example, if the West portion 166 and East portion 168 of network topology map 154 were designated "$\lambda_E$-NE2" and "$\lambda_E$-NE2," respectively, then the designations would indicate that wavelength 120 was being transmitted by NE2 104 in both the West and East directions. Additionally, if the West portion 166 and East portion 168 of network topology map 154 were designated "$\lambda_E$-NE2" and "$\lambda_E$-NE5," respectively, then the designations would indicate that wavelength 120 was being received by NE2 104 from NE5 110 and transmitted by NE2 104 in the West direction. The updated wavelength topology maps 152-160 may be employed by a NOC or craft, for example, to provide visibility into the entire system from a single network element. In particularly, the wavelength topology map and protocol messaging scheme of the present invention provides visibility into source and destination information as well as visibility into passthrough wavelengths.

Figure 2:
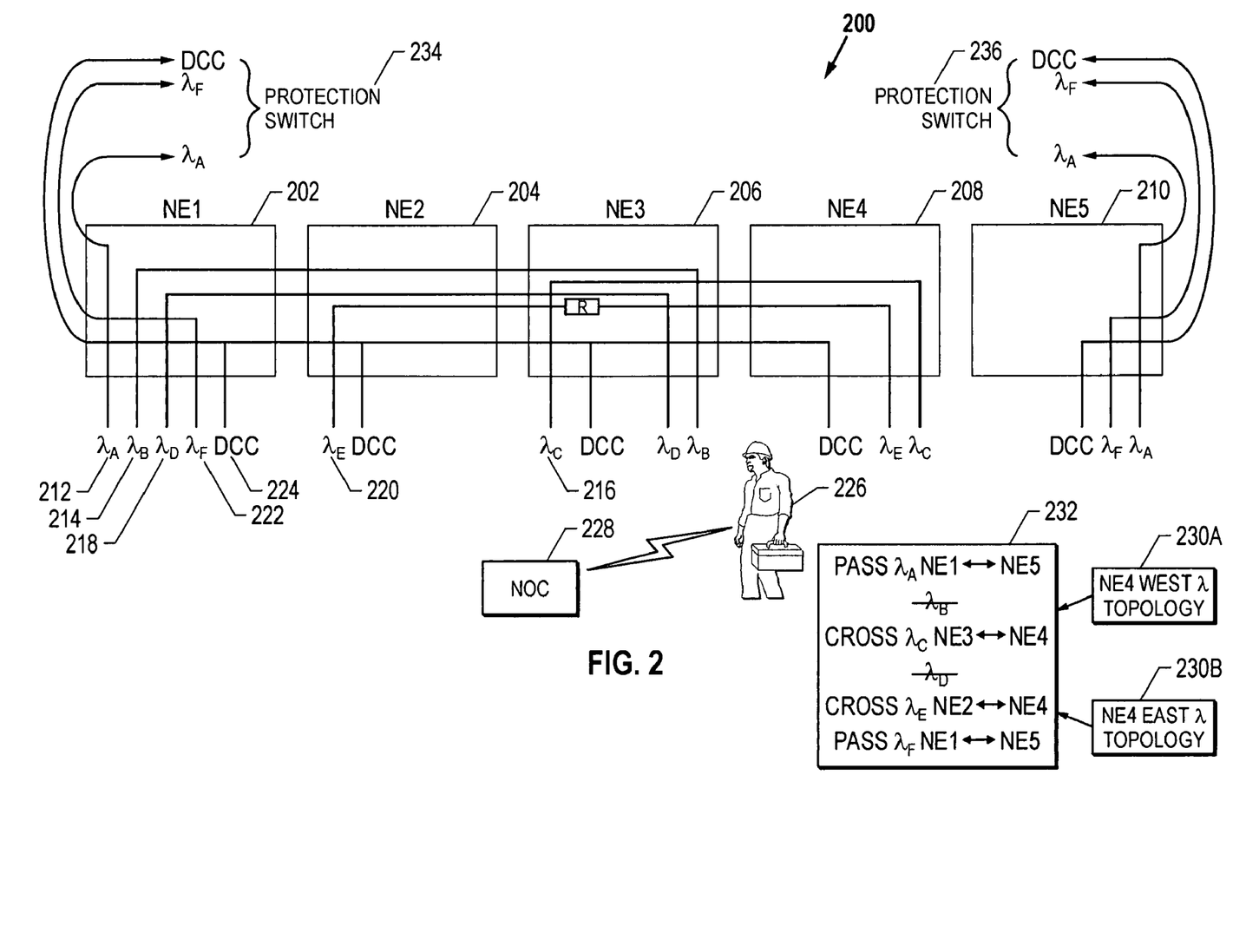
FIG. 2 depicts a schematic diagram of an exemplary embodiment of an optical network undergoing maintenance operations wherein the updated wavelength topology maps of the present invention are utilized to effectuate protection switching.

FIG. 2 depicts an optical network 200 undergoing maintenance operations wherein the updated wavelength topology maps of the present invention are utilized in order to effectuate a protection switch mechanism. Similar to FIG. 1A, the optical network 200 includes a linear portion defined by network elements 202-210. Wavelengths 212-222, i.e., $\lambda_A$ through $\lambda_F$ comprise the traffic among network elements 202-210. Additionally, a dedicated DCC wavelength channel 224 provides for the transmission of OAM&P as well as the forwarding of wavelength topology maps to adjacent network elements. As illustrated, craft 226 is performing maintenance operations on NE4 208 while communicating with a NOC 228. As previously discussed, the craft 226 may access the NE4 208 via a terminal that provides necessary local operation and maintenance functionality. In particular, the terminal allows the craft 226 to activate/deactivate the network element and verify performance management by way of a set of functions that collect, process and display network traffic.

Using the terminal, craft 226 accesses via NE4 208 West wavelength topology map 230A and the East wavelength topology map 230B. For the craft's convenience, the West and East topology maps 230A and 230B are presented to the craft 226 as a consolidated wavelength topology map 232. In one embodiment, the terminal provides a graphical user interface (GUI) that displays a graphical map of the optical network 200. The graphical map may provide a quasi-photographic representation at the highest level, e.g., WDM ring, going down to block diagram views, thus offering very detailed easy-to-analyze information about the status of various network elements. Throughout all presentation layers, consistent alarm information and wavelength topology maps may be propagated. The wavelength topology map 232 indicates that wavelengths 216 and 220 are added and dropped at NE4 208 since NE4 208 forms cross-connections with NE3 206 with respect to wavelength 216 and N25 204 with respect to wavelength 220. Additionally, wavelength 212 passes through NE4 208 as part of the cross-connection between NE1 202 and NE5 210. Similarly, wavelength 222 passes through NE4 208 as part of the cross-connection between NE1 202 and NE5 210. Further, wavelength topology map 232 indicates that wavelengths 214 and 218 are not associated with NE4 208.

In one embodiment, the maintenance operations the craft 226 will perform may involve taking NE4 208 off-line. By utilizing wavelength topology map 232 (which should be understood to mean the direction-specific map implementation set forth above), the craft 226 has an indication that wavelengths 216 and 220 will require accommodation since these wavelengths are inserted and dropped at NE4 208 as parts of cross-connections. Moreover, the wavelength topology map 230 provides an indication that wavelengths 212 and 222 pass through NE4 208 and also require accommodation. With respect to wavelengths 212 and 222, the craft 226 and the NOC 228 utilize the source and destination information, i.e., wavelengths 212 and 222 originate between a cross-connection defined by NE1 202 and NE5 210, provided by the wavelength topology map 230 to activate protection switches 234 and 236 so that wavelengths 212 and 222 may be rerouted. Hence, by providing accessible and accurate wavelength topology maps that include passthrough wavelengths in network elements having an optical architecture, the present invention prevents traffic from being lost during maintenance operations.

Figure 3:
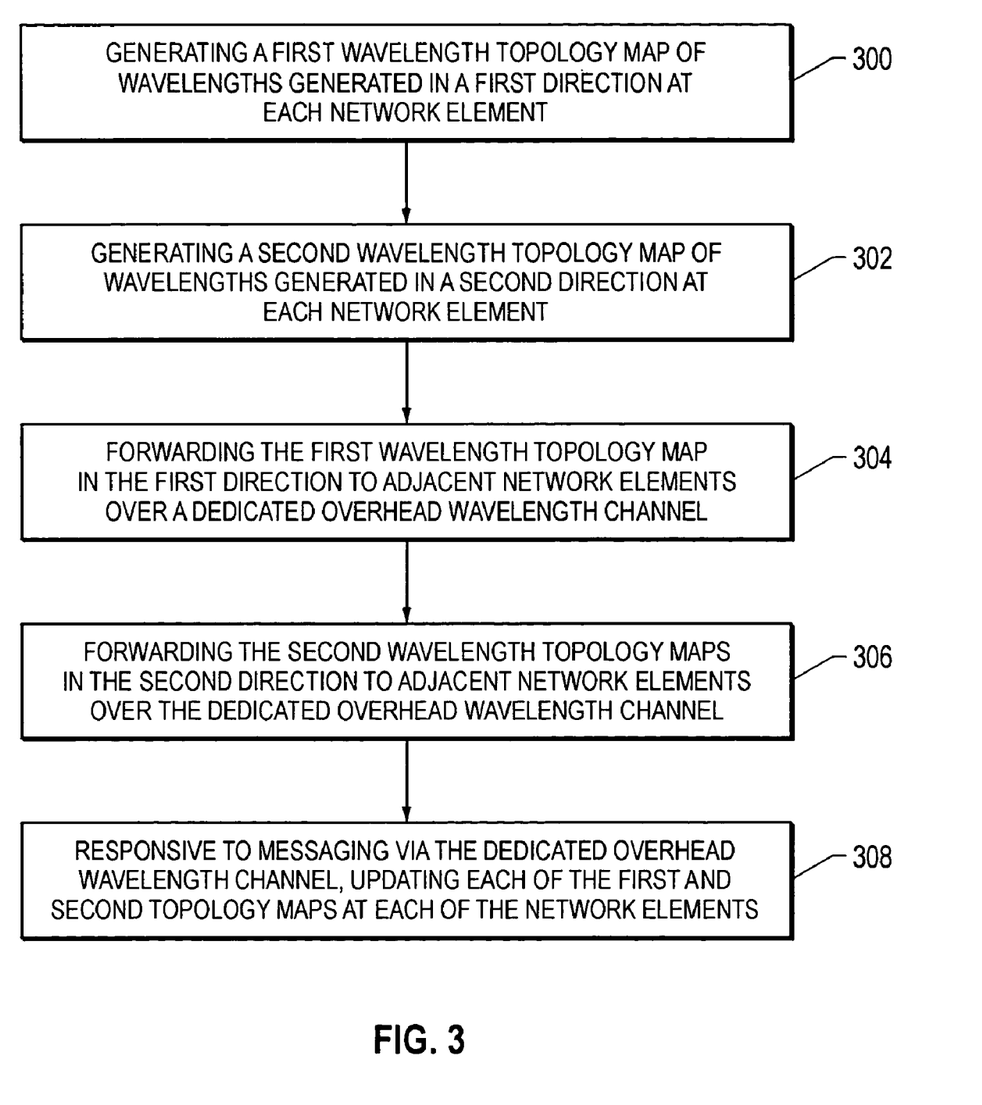
FIG. 3 depicts a flow chart of one embodiment of a method for discovering wavelengths in network elements having an optical architecture in accordance with the teachings of the present invention.

FIG. 3 depicts one embodiment of a method for discovering wavelengths in network elements having an optical architecture in accordance with the teachings of the present invention. At block 300, a first wavelength topology map is generated of wavelengths inserted in a first direction at each network element. At block 302, a second wavelength topology map is generated of wavelengths inserted in a second direction at each network element. At block 304, the first wavelength topology maps are forwarded in the first direction to adjacent network elements over a dedicated overhead wavelength channel. At block 306, the second wavelength topology maps are forwarded in the second direction to adjacent network elements over the dedicated overhead wavelength channel. At block 308, responsive to messaging via the dedicated overhead wavelength channel, each of the first and second topology maps at each of the network elements are updated. It should be appreciated that within the network elements, first topology maps update first topology maps and second topology maps update second topology maps. As previously discussed, by updating the first and second topology maps, the source and destination information may be discovered for all wavelengths in the network. Further, the updated wavelength topology maps may be utilized to provide a craft person an indication of the passthrough wavelengths in the network elements. Moreover, the updated local wavelength maps may be employed during maintenance operations on the network elements to determine protection switching and to provide an indication of how the network elements interact with each other.

Although the invention has been described with reference to certain exemplary embodiments, it is to be understood that the forms of the invention shown and described are to be treated as presently preferred exemplary embodiments only. Accordingly, various changes, substitutions and modifications can be realized without departing from the spirit and scope of the invention as defined by the appended claims.

What is claimed is:

1. An optical network element in an optical wavelength division multiplexed (WDM) ring network, the optical network element comprising:

a plurality of transponders for generating a plurality of wavelengths inserted in a first direction over the optical WDM ring network, wherein at least one of the plurality of wavelengths inserted in the first direction is received by the network element in a second direction from another network element in the optical WDM ring network to form a cross-connection;

a receiver for receiving a wavelength topology map over a dedicated overhead wavelength channel from an adjacent network element in the optical WDM ring network, wherein the wavelength topology map includes a map portion that specifies the wavelengths inserted by the adjacent network element in a second direction to the network element;

wherein the network element is operable to determine passthrough wavelengths from the wavelength topology map.

2. The optical network element of claim 1, wherein the network element is operable to determine passthrough wavelengths from the wavelength topology map and from the wavelengths generated by the plurality of transponders and inserted in a first direction over the optical WDM ring network by the network element.

3. The optical network element of claim 2, wherein the network element is operable to determine passthrough wavelengths in response to comparing the wavelengths inserted in a first direction by the network element to the wavelengths specified in the wavelength topology map as inserted by the adjacent network element in a second direction to the network element.

4. The optical network element of claim 2, wherein the network element is operable to determine passthrough wavelengths in response to comparing wavelengths being dropped from the second direction by the network element to the wavelengths specified in the wavelength topology map as inserted by the adjacent network element in the second direction to the network element.

5. A method for determining passthrough wavelengths in an optical network element in an optical wavelength division multiplexed (WDM) ring network, comprising:

inserting in a first direction a first set of wavelengths over the optical WDM ring network;

receiving in a second direction one of the first set of the wavelengths over the optical WDM ring network from another network element in the optical WDM ring network to form a first cross-connection;

inserting in a second direction a second set of wavelengths over the optical WDM ring network;

receiving in a first direction one of the second set of wavelengths over the optical WDM ring network from another network element in the optical WDM ring network to form a second cross-connection;

receiving a first wavelength topology map from a first adjacent network element in the optical WDM ring network over a dedicated overhead wavelength channel, wherein the first wavelength topology map includes a first map portion that specifies wavelengths inserted by the first adjacent network element in the first direction to the network element;

receiving a second wavelength topology map from a second adjacent network element in the optical WDM ring network over a dedicated overhead wavelength channel, wherein the second wavelength topology map includes a second map portion that specifies wavelengths inserted by the second adjacent network element in a second direction to the network element;

determining passthrough wavelengths in response to determining wavelengths inserted in a first direction by the network element are not equal to wavelengths specified in the second wavelength topology map as inserted by the second adjacent network element in a second direction to the network element; and determining passthrough wavelengths in response to determining wavelengths inserted in a second direction by the network element are not equal to wavelengths specified in the first wavelength topology map as inserted by the first adjacent network element in a first direction to the network element.

6. The method of claim 5, further comprising:

generating by a first plurality of transponders wavelengths in the first direction to the second adjacent network element over the optical WDM ring network; and generating by a second plurality of transponders wavelengths in a second direction to the first adjacent network element over the optical WDM ring network.

* * * * *

UNITED STATES PATENT AND TRADEMARK OFFICE
CERTIFICATE OF CORRECTION

PATENT NO. : 7,650,073 B2 Page 1 of 1
APPLICATION NO. : 10/750123
DATED : January 19, 2010
INVENTOR(S) : Burnett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Twenty-eighth Day of December, 2010

David J. Kappos
*Director of the United States Patent and Trademark Office*